Sept. 19, 1961 C. J. LINGELBACH, JR 3,000,744
FOOD PACKAGE AND METHOD OF MAKING SAME
Filed Sept. 8, 1958 4 Sheets-Sheet 1
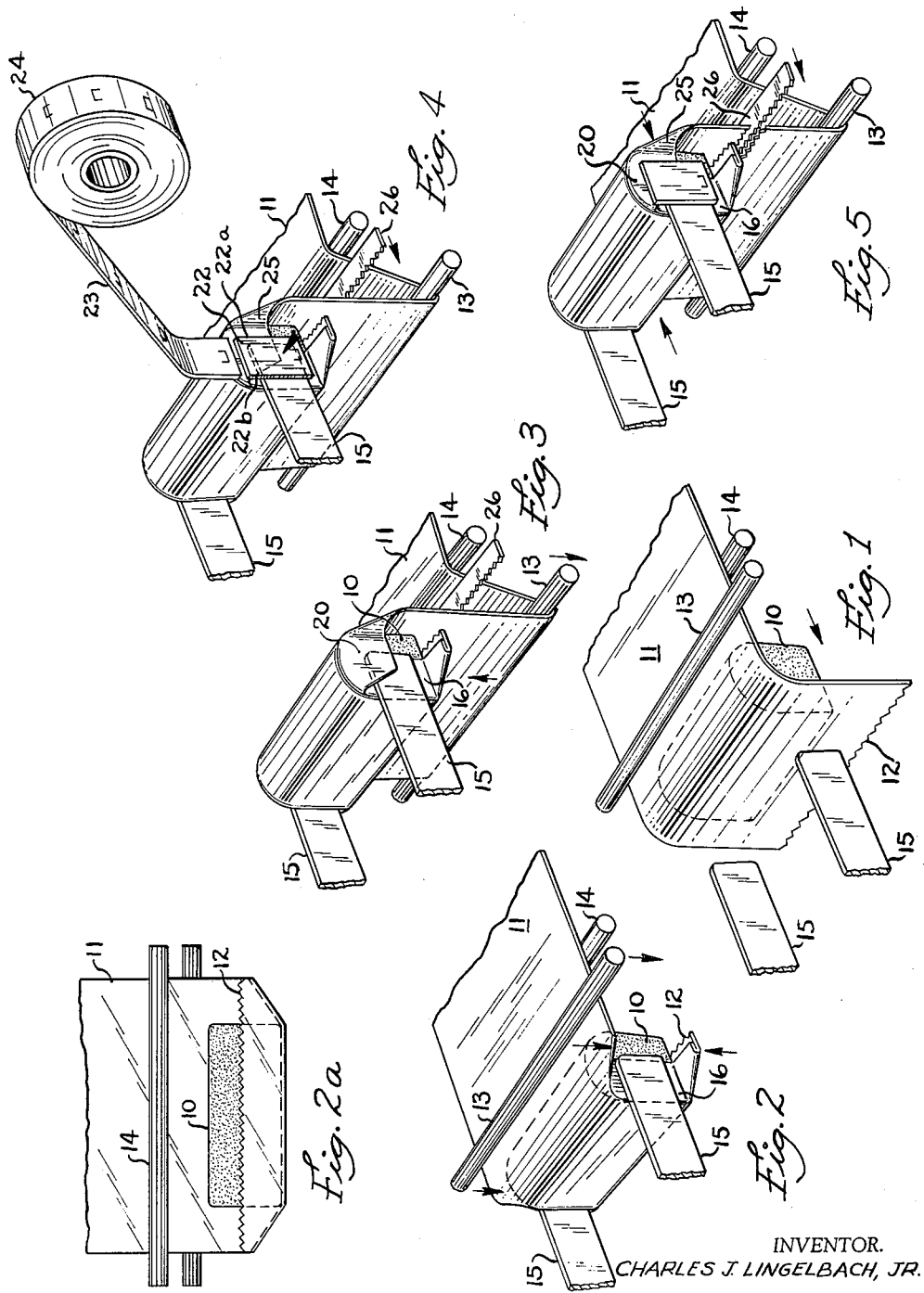
INVENTOR.
CHARLES J. LINGELBACH, JR.
BY Donald G. Wolff
Joseph Roseman
ATTORNEYS Sept. 19, 1961  C. J. LINGELBACH, JR  3,000,744
FOOD PACKAGE AND METHOD OF MAKING SAME
Filed Sept. 8, 1958  4 Sheets-Sheet 2

INVENTOR.
CHARLES J. LINGELBACH, JR.
BY Donald G. Wolff
Joseph Rilson
ATTORNEYS

Sept. 19, 1961　　　C. J. LINGELBACH, JR　　　3,000,744
FOOD PACKAGE AND METHOD OF MAKING SAME
Filed Sept. 8, 1958　　　　　　　　　　　　4 Sheets-Sheet 3

INVENTOR.
CHARLES J. LINGELBACH, JR.
BY Donald G. Wolff
　　 Joseph Rosenman
　　　　　ATTORNEYS Sept. 19, 1961  C. J. LINGELBACH, JR  3,000,744
FOOD PACKAGE AND METHOD OF MAKING SAME
Filed Sept. 8, 1958  4 Sheets-Sheet 4

INVENTOR.
CHARLES J. LINGELBACH, JR.
BY Donald G. Wolff

ATTORNEYS

United States Patent Office 3,000,744
Patented Sept. 19, 1961

3,000,744
FOOD PACKAGE AND METHOD OF MAKING SAME
Charles J. Lingelbach, Jr., Appleton, Wis., assignor to American Can Company, New York, N.Y., a corporation of New Jersey
Filed Sept. 8, 1958, Ser. No. 759,758
5 Claims. (Cl. 99—172)

This invention relates to improvements in the art of packaging articles, especially food articles, in folded wrappers having sealed end closures. In its preferred aspect, this invention relates to a heat-sealed, wrapped food package, such as a bread package, having folded and sealed end closures and having a tear card inserted and adhered between the folds of at least one end of the bread package and partly exposed to enable grasping of the tear card for opening the sealed end of the package. In another of its aspects, this invention relates to a method for forming a folded and sealed end closure for a wrapped package to provide said end closure with means for opening of the same. In still another of its aspects, this invention relates to a tear card adapted to be inserted and adhered within the folded end flaps of a sealed, wrapped package.

Considerable difficulty has been encountered by consumers in opening heat-sealed packages made of flexible, heat-sealable sheet materials, such as waxed paper, cellophane, polyethylene and the like, particularly when it is desired to open one of the ends of the package for obtaining access to the contents and for reclosing the partially used package. The present invention is adapted to overcome this problem, particularly in connection with the heat-sealed bread packages which are in current use today, having overlapped heat-sealed folded end flaps on the package which are sealed with an end label over the folded end flaps.

Figure 6:
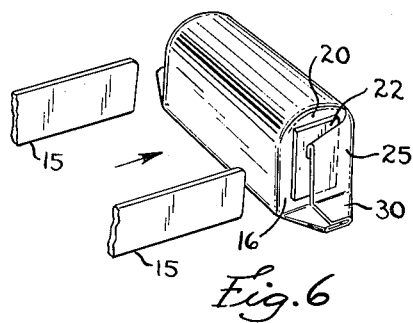
Figure 6A:
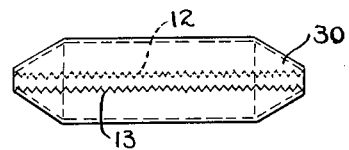
Figure 7:
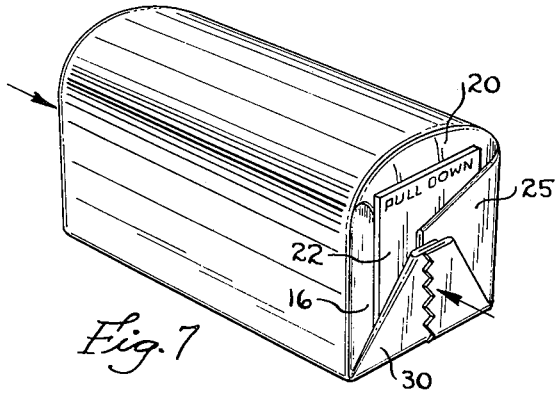
Figure 9:
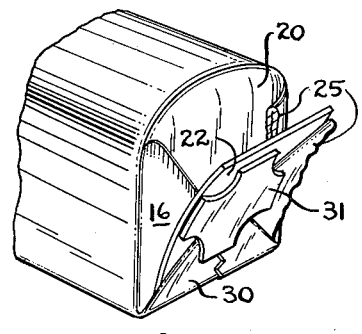
Figure 8:
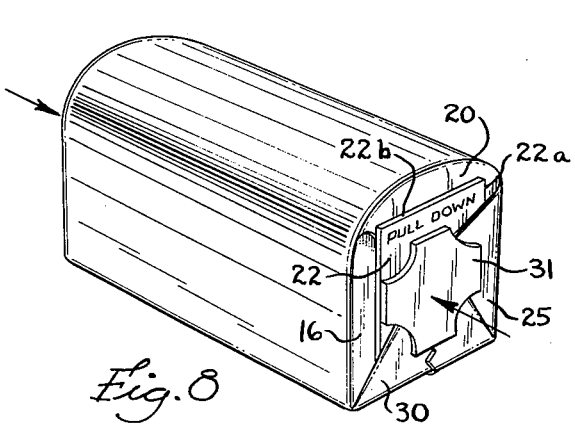
Figure 10:
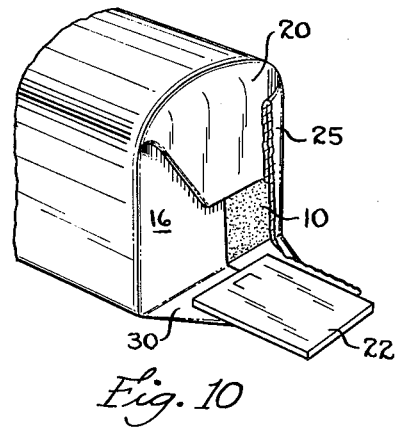
Figure 14A:
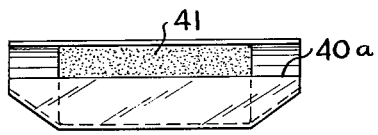
Figure 15:
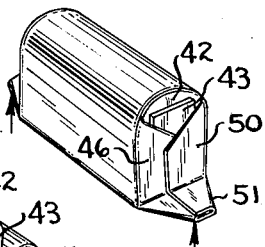
Figure 14:
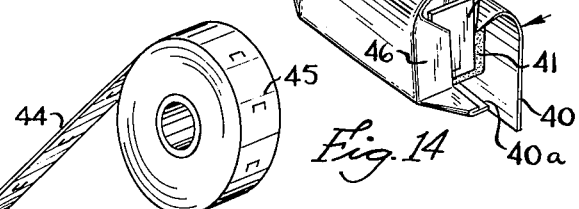
Figure 13:
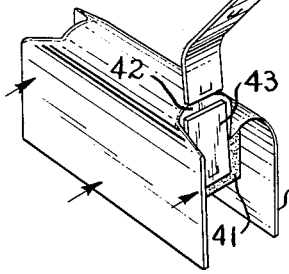
Figure 15A:
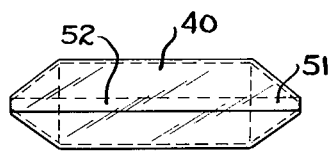
Figure 12:
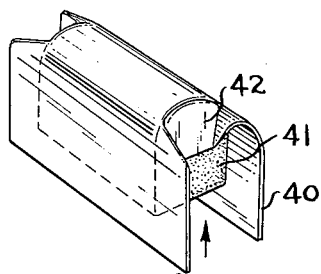
Figure 20:
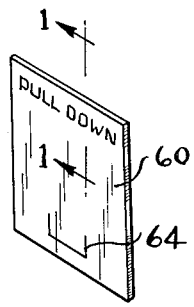
Figure 22:
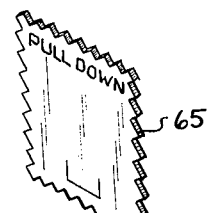
Figure 11:
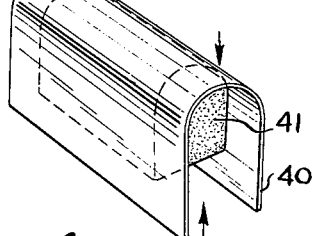
Figure 21:
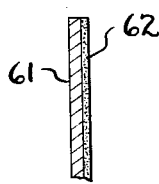
Figure 16:
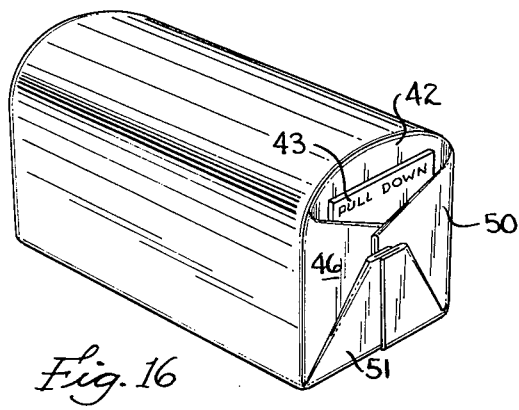
Figure 17:
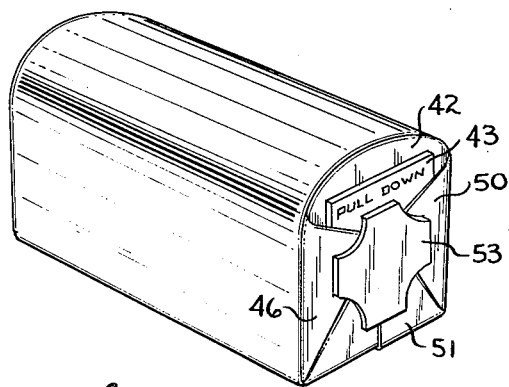
Figure 18:
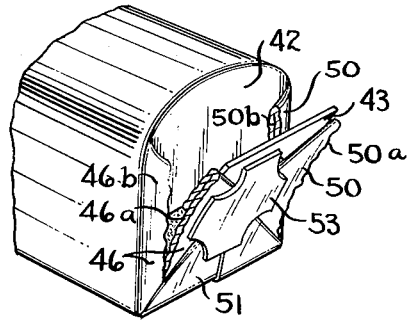
Figure 19:
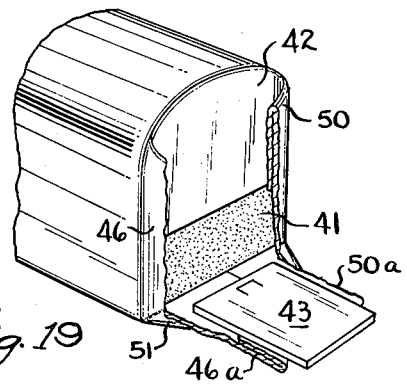

Referring to the drawings, FIGURES 1 through 8 illustrate sequently a series of steps in one embodiment of a method for forming a package in accordance with the present invention, wherein FIGURE 1 is a perspective view showing a loaf of bread in position to be wrapped, FIGURE 2 is a perspective view showing the loaf partially wrapped having the first end flap folded over and half of the bottom panel formed, FIGURE 2a is a plan view looking upwardly toward the bottom of the loaf as shown in FIGURE 2 showing the longitudinal alignment of the edge of the sheet of wrapping paper with the loaf of bread, FIGURE 3 is a perspective view showing the elevation of the loaf upwardly and the folding over of the second end flap transverse to the first end flap, FIGURE 4 is a perspective view showing the application of a tear card in the proper position over the second end flap, FIGURE 5 is a perspective view showing the continuous sheet of wrapping material being cut and the partially wrapped loaf being advanced horizontally, FIGURE 6 is a perspective view showing the folding of the third end flap over the tear card and the completion of the bottom panel of the wrapper, FIGURE 6a is a plan view looking upwardly toward the bottom of the loaf as shown in FIGURE 6 illustrating the bottom panel as formed and the overlapping of the edges of the sheet of wrapping material, FIGURE 7 is a perspective view showing the fourth end flap folded transversely over the third end flap and over the tear card, FIGURE 8 is a perspective view showing a completed bread package having an end label applied over the end of the package, FIGURE 9 is a perspective view of the end of the bread package partly opened showing the manner in which the tear card effects opening, FIGURE 10 is a perspective view of the end of the bread package showing it completely opened and the bread exposed, FIGURES 11 through 17 illustrate sequentially a series of steps in another embodiment of a method for forming a package in accordance with the present invention, wherein FIGURE 11 is a perspective view showing a loaf of bread in aligned relationship with a sheet of wrapping material in which it is to be wrapped, FIGURE 12 is a perspective view showing a loaf partially wrapped and having the first end flap flolded over the end of the loaf, FIGURE 13 is a perspective view showing the application of a tear card in the proper position onto the first formed flap, FIGURE 14 is a perspective view showing the second end flap folded over the tear card transverse to the first end flap, and the formation of part of the bottom panel of the bread package, FIGURE 14a is a plan view looking upwardly toward the bottom of the loaf of bread shown in FIGURE 14 showing the alignment of the edge of the sheet of wrapping paper longitudinally with the bottom of the loaf, FIGURE 15 is a perspective view showing the third end flap folded over the second end flap transversely thereto and over the tear card, and the completion of the bottom panel of the bread package, FIGURE 15a is a plan view looking upwardly toward the bottom of the loaf of bread shown in FIGURE 15 illustrating the bottom panel of the package and the overlapping of the edges of the sheet of wrapping material, FIGURE 16 is a perspective view showing the fourth end flap folded over the third end flap, FIGURE 17 is a perspective view showing the completed bread package having an end label applied over the end of the package, FIGURE 18 is a perspective view showing the end of the bread package of FIGURE 17 partly opened and showing the tear card tearing the second and third end flaps, FIGURE 19 is a perspective view of the end of the bread package showing it completely opened and the bread exposed, FIGURE 20 is a perspective view showing a tear card used in accordance with the present invention, FIGURE 21 is a sectional view of a portion of the tear card looking in the direction of the arrows along line 1—1 in FIGURE 20, and FIGURE 22 is a perspective view showing another embodiment of the tear card useful in accordance with the present invention.

In general, this invention is concerned with a wrapped package having sealed folded end flaps and having inserted within the folds of at least one end and peelably (removably) adhered to the surface of an inner end flap a tear card which has a tensile and shearing strength greater than that of an overlying flap. An edge portion of the tear card is exposed to permit grasping same and it has an edge portion positioned adjacent the inner folded edge of an overlying flap so that when it is pulled down it will tear the overlying flap or flaps to provide easy access to the commodity packaged within the wrapper.

With respect to the expression "tear card" as used in the following description and claims, it will be understood that the word "card" refers to any type of suitable sheet material, as will be defined more fully hereinafter, which may be inserted between the folded end flaps as disclosed herein for accomplishing the mechanical purpose of tearing open the end of the package as described. The tear card can also serve as an advertising medium providing information on the commodity packaged, or about other products of the manufacturer. It can be used also for printing thereon recipes or pictures of famous personalities to be collected by children, or as printed coupons having redemption value.

Referring to the sequence of views in FIGURES 1 through 8, a loaf of bread 10 is brought into aligned relationship with a continuous sheet or web of heat-sealable wrapping material 11, such as waxed paper, cellophane, polyethylene, or the like, having its leading edge 12 extending a predetermined distance below the bottom of the loaf. The continuous sheet of wrapping material, supplied from a roll (not shown), is held between two guide bars 13 and 14 which are also aligned with loaf 10 which may be sliced. Loaf 10 is then moved horizontally into contact with sheet 11 and with a pair of rigid supporting surfaces 15 to form and fold thereunder a first end flap 16. During this horizontal movement, leading edge 12 of sheet 11 is folded under the bottom of loaf 10 to align the edge 12 longitudinally with the loaf and to form a portion of the bottom panel of the bread wrapper. See FIGURE 2a. If desired, rigid supporting surfaces 15 may be heated to activate the coating or substance of the wrapping material.

The loaf of bread and wrapping material, while still in engagement with rigid supporting surfaces 15, are raised upwardly a predetermined distance and at the same time guide bar 13 is moved downwardly to bring the sheet around to the other side of the loaf to form the second side panel. In this upward movement a second flap 20, transverse to flap 16, is folded downwardly over said flap 16 and on top of supporting surface 15. In the elevated position, a tear card 22, the details of which will be described more fully hereinafter, is adhered to the outer surface of flap 20 by means of heat and pressure, rigid supporting surface 15 providing a base against which pressure can be applied. Tear card 22 is cut from a continuous web 23 supplied from roll 24. The positioning of tear card 22 on flap 20 is such that one side edge 22a of the tear card is adjacent to the inner folded edge of the next-to-be-folded flap 25. Also, the upper edge 22b of tear card 22 is positioned in relationship to the end of the package so that it will be exposed to enable grasping same when all of the end flaps are folded. The positioning of the tear card on the end of the loaf before the next folding step is shown in FIGURE 5. It is important that tear card 22 be adhered to flap 20 in order to avoid movement and dislocation of the tear card in the subsequent folding operation. It is also important that tear card 22 can be peeled away from flap 20 when the package is subsequently opened. Peeling can be controlled by the nature of the adhesive used on tear card 22 which will be described more fully hereinafter. In the application of tear card 22 to flap 20 the adhesive coating on the tear card is activated with heat prior to being pressed against the outer surface of flap 20 which is represented schematically by arrow in FIGure 4.

After tear card 22 has been adhered to flap 20, cutting knife 26 cuts continuous sheet 11 at a predetermined point to provide the remainder of the sheet necessary for the bottom panel of the loaf of bread. At the same time the loaf of bread is advanced horizontally out of contact with rigid supporting surface 15 and flap 25 is folded over on top of tear card 22, transverse to flap 20, as shown in FIGURE 6. In the same horizontal movement, the trailing edge 13 of the sheet is folded under to complete the bottom panel of the bread package and to form the remainder of the last end flap 30. In FIGURE 6a, the bottom panel is shown having the two edge portions 12 and 13 overlapping. The overlapping edges can be sealed by means of heat applied to the edges of the wrapping material to activate the coating. Flap 30 is then folded upwardly over flap 25 to complete the package as shown in FIGURE 7. Heat and pressure may then be applied to seal the folds together as represented schematically by arrows in FIGURE 7, although this may not be necessary if the flaps have been heated to activate the adhesive coating thereon prior to folding. After all the flaps have been folded with the tear card adhered and positioned between two of the flaps, a conventional end label 31 can be applied, such as is disclosed in Smith et al. U.S. Patent No. 2,228,785. The end label 31 provides a tight seal covering the unsightly folded ends and also provides a medium for advertising. End labels may be applied to both ends of the package by means of heat and pressure, as illustrated schematically by arrows in FIGURE 8. Conventional end labels are provided with an adhesive which adheres quite tenaciously to the end of the package and it is normally impossible to remove an end label without destroying the end of the package. With the package of the present invention this problem is obviated since the end label remains adhered to the outer flap and portion of inner flap torn in opening the package.

It will be appreciated that the folding and sealing steps described hereinabove can be accomplished either by hand or by the utilization of suitable automatic equipment. For example, rigid surfaces 15 can be the folding bars in a conventional bread wrapping machine.

Referring to FIGURE 8, it will be noted that tear card 22 is adhered to flap 20 and has a side edge portion adjacent to the inner folded edge of flap 25 to facilitate tearing of flap 25 upon being drawn thereagainst. Also, the upper edge portion 22b of tear card 22 extends beyond the end of the outermost flap 30 and beyond the free edge of end label 31 to enable grasping. In the opening of the package, tear card 22 is removed by being peeled away from flap 20, as shown in FIGURES 9 and 10, thereby rupturing overlying flap 25 near its inner folded edge. It will also be noted that the end of loaf 10 is exposed for grasping after separating flap 20 from flap 16. After withdrawal of a desired number of slices of the bread, at least three flaps are available for effecting reclosure of the package and a small portion of torn flap 25 is also available. Tear card 22 can, if desired, be stripped from flaps 25 and 30 and be either discarded or saved depending upon whether some useful purpose for the tear card still remains.

It should be noted that FIGURES 1 through 8 and 11 through 17 of the drawings illustrate the folding and sealing steps on one end of the package. Identical folding and sealing steps may also take place simultaneously on the other end of the package. The application of a tear card to an inner end flap on the opposite end of the package is optional, however.

Referring to FIGURES 11 through 17 of the drawings, a sheet of heat-sealable wrapping material 40, such as waxed paper, is draped over a loaf of bread 41 longitudinally to provide marginal edges to be folded into end flaps for closure purposes. In the folding operation, the loaf of bread and wrapping material are elevated upwardly and a first flap 42 is folded downwardly over the end of the loaf of bread. A tear card 43, of the nature described hereinabove, cut from continuous web 44 and fed from supply roll 45, is adhered in a preselected position onto flap 42. The positioning of said tear card 43 is such that its side edges are adjacent to the inner folded edges of side flaps to be formed later in the folding operation. The top edge of tear card 43 is positioned such that it will be exposed to enable grasping same after the package is completely closed. The tear card 43 is adhered to flap 42 in a manner such that it can be peeled from flap 42 when the package is subsequently opened.

After the tear card 43 has been adhered to flap 42, a second end flap 46 is folded over tear card 43 transverse to said flap 42 and the longitudinal edge 40a of sheet 40 is folded under loaf 41 to form part of the bottom panel of the package, as shown in FIGURE 14a. In the next step, a third flap 50 is folded over flap 46 opposed thereto and over tear card 43. In this operation the bottom panel of the bread package is completed and the remainder of the final flap 51 formed. The longitudinal seam 52 formed in the closure of the bottom panel is sealed as for example by activating the adhesive coating of the wrapping material along said longitudinal edge. After the bottom panel has been formed, flap 51 is then folded upwardly to complete the end folds and sealed as represented schematically by arrows in FIGURE 16. A conventional end label 53 as described hereinabove is then applied over all of the end folds.

FIGURE 17 shows the completed bread package having tear card 43 peelably adhered to flap 42 and having its two side edges adjacent to the inner folded edges of flaps 46 and 50 so that when it is drawn downwardly thereagainst, as illustrated in FIGURE 18, these flaps will be torn along respective lines 46a and 50a. In FIGURE 19, the end of the package is shown completely opened, illustrating that side flaps 46 and 50 are torn adjacent their inner folded edges 46a and 50a by the tear card. In this embodiment of the package, more of the bread is exposed upon opening, but only two flaps are available for effective reclosure of the package.

Referring to FIGURES 21 and 22 of the drawings, tear card 60 is comprised of a base sheet 61 (see FIGURE 21) coated on at least one side thereof with a non-tacky, easy peeling, heat activatable adhesive coating 62. The dimensions of the tear card are chosen to coordinate with the dimensions of the end of the package in which it will be employed. For example, the width of the tear card approximates the distance between the inner folded edges of opposed side flaps, and the height of the tear card is greater than the length of the outermost flap to ensure an exposed portion for grasping. Preferably, the distance between the inner folded edges of opposed side flaps on the end of the package is about one inch greater than the width of the tear card. Side margins or tabs 46b and 50b, for example, about one-half inch in width, are preferably retained after the tear card has torn the overlying flap, as shown in FIGURE 18. The height of the tear card is preferably about one and one-half times the length of the outermost flap.

Base sheet 61 of the tear card is chosen of predetermined physical characteristics in relation to the type of heat-sealable wrapping material employed in making the package. It is necessary that the base sheet have tensile and shearing strength greater than that of the overlying flap or flaps which will be ruptured upon opening the package. Thus, the base sheet may be, for example, high-strength paper, such as dry-waxed cup stock paper having a weight of at least 50 lbs. (per ream, 500—24 x 36), resin reinforced paper, heavy gauge kraft paper, paperboard, metal, plastics, and the like. When ordinary 35 to 40 lb. (per ream, 500—24 x 36) wax paper is used as the heat-sealable wrapping material, a preferred base sheet for my tear card consists of a dry-waxed cup stock paper having a weight of at least 50 lbs. and preferably about 65 lbs. per ream.

The characteristics of the adhesive coating 62 on base sheet 61 used in making the tear card are important. The coating must be non-tacky since the tear card is normally provided in a continuous roll and should not block or adhere to itself. Also, the seal strength of the adhesive must be such that the tear card can be easily peeled from the flap upon which it is adhered in the wrapping operation in order to prevent destruction of the flap in the opening of the package. Further, the adhesive should be heat activatable to provide sufficient tack to adhere the tear card to the flap against which it is pressed in order to prevent dislocation of the tear card during subsequent movement of the package in the wrapping operation. Numerous adhesive compositions meeting the requirements can be found in the adhesive literature. The coating compositions are generally characterized by having a major proportion of paraffin wax. One adhesive composition which may be used contains about 10% by weight of aluminum stearate, 15% by weight of ester gum and 75% by weight of paraffin wax. Another adhesive composition which may be used contains, by weight, 15% natural rubber, 15% ester gum, and 70% paraffin wax. In general, an adhesive composition containing a major proportion of paraffin wax and from 3 to 12% aluminum stearate, 5 to 20% ester gum and 0 to 30% microcrystalline wax can be used. In the foregoing composition, the proportion of ingredients other than paraffin wax is chosen so as to constitute together a minor proportion of the total composition. The specific compositions described hereinabove can be used in conjunction with a dry-waxed cup stock paper base having about 65 lbs. per ream of weight. The amount of adhesive used in proportion to the amount of paper stock will vary depending upon the density of the adhesive composition and its ability to form a continuous film on the base sheet. Generally, about 15 to 20 lbs. per ream of adhesive will be adequate.

Another important feature in my tear card is the provision of means for facilitating its application to the flap upon which it is to be adhered when this application is accomplished by means of automatic equipment. One means which can be employed is a U-shaped slit 64, as shown in FIGURE 20. Other means such as punched holes, notched corners and serrated edges can also be employed to facilitate positioning and registering of the tear card when applying the same to the flap. It should be noted that the nature of this means in the tear card will depend upon the nature of the equipment used to apply the tear card to the package. That is to say, the machinery for advancing the tear card into position may be provided with a notch or notches, lugs, or teeth to engage the tear card and advance and position it.

It is also possible, when desired or necessary, to provide the edge of the tear card which is to rupture the overlying flap with reinforcement or with other means to facilitate rupturing of the flap. For example, the edges of the tear card 65 illustrated in FIGURE 22 are serrated to provide a saw-toothed surface against which the overlying flap will be torn. In such an instance, it is possible for the serration to serve the double purpose of facilitating registration of the tear card in its application to the inner flap and improve its ability to rupture the overlying flap. In the former function, it would be necessary that the automatic machinery for applying the tear card material have an advancing mechanism including teeth in which case proper threading of the tear card material would be necessary. Another method of reinforcing the edge of the tear card material is to indurate the same, as for example by treatment with molten sulfur and other well-known indurating agents, such as sodium silicate.

It is also desirable for effective utilization of the tear card to have printed instructions appear in an obvious place, such as on the exposed grasping portion. Further, as mentioned hereinbefore, other printed indicia on the tear card, either on one side or both, may be desirable from the manufacturer's and/or user's standpoint.

Although this invention has been described and exemplified in terms of its preferred embodiments, those skilled in the art will readily appreciate that modifications can be made without departing from the spirit and scope of the invention as defined broadly in the appended claims.

I claim:

1. A method of packaging a loaf of bread comprising bringing the loaf into predetermined aligned relationship with a sheet of heat-sealable wrapping material; moving said loaf horizontally into contact with said sheet and both into contact with a pair of rigid supporting surfaces to form on both ends of the loaf a first end flap, said movement concomitantly positioning one edge of the sheet longitudinally along the bottom of the loaf; moving said loaf upwardly while still in engagement with said rigid supporting surfaces to form on both ends a second overlapping transverse end flap on top of the supporting surface; adhering a tear card to at least one of said second flaps in a preselected position; moving said loaf horizontally out of engagement with said supporting surfaces to concomitantly form on both ends a third overlapping flap opposed to said first flap and to close the bottom panel of the wrapper; folding the one remaining flap on both ends to close the package; and sealing both ends of said package by means of heat and pressure.

2. The method according to claim 1, further including the step of applying end labels over both outermost flaps prior to sealing with heat and pressure.

3. A package comprising a food article completely enclosed in a flexible wrapper folded about the body portion of said food article and having integral marginal portions extending from the main wrapper portion beyond the ends of said article to form folded end flaps, at least one end of said package being closed by a plurality of sealed overlapping folded flaps including a downwardly extending inner flap, a pair of opposed transversely extending flaps and an outermost upward extending flap, a tear card of sheet material having tensile and shearing strength greater than the shear strength of said flaps positioned within the pocket formed by at least two overlapped flaps and removably adhered to the outside surface of the inner flap forming said pocket, said tear card being dimensioned and positioned to partially underlie the outer flap forming said pocket and also partially underlying the said upwardly extending outermost flap, a side edge of said tear card being positioned intermediate the fold connection of said outer pocket-forming flap to the main wrapper portion and the remote edge of said flap, the top edge portion of said tear card extending beyond the upper edge of said outer pocket-forming flap to provide an exposed grasping portion, said package being adapted to be opened by pulling the said exposed grasping portion of said tear card outwardly and downwardly against said overlying pocket-forming flap to rupture same.

4. A package as defined in claim 3 having an end label superposed on the exposed surfaces of the folded end flaps and adhered thereto.

5. A method of completely enclosing a food article in a heat-sealable wrapper which comprises the steps of folding the wrapper completely about the body portion of the article, said wrapper being dimensioned to provide an integral marginal wrapper portion extending from the main wrapper portion beyond the ends of said article for forming folded end flaps, folding a portion of said extending marginal portion to form a folded flap, superposing on said folded flap a tear card of sheet material of predetermined dimensions and having tensile and shearing strength greater than the shear strength of said flaps, removably adhering said tear card to the outside surface of said folded flap, folding an adjacent marginal portion of said wrapper partially over said tear card and said folded flap to provide a superposed flap together with said folded flap forming a pocket portion containing said tear card, said tear card being positioned to partially underlie said pocket-forming flap and having the upper edge extending beyond the upper edge of said pocket to provide a grasping portion, a side edge of said tear card being positioned intermediate the fold connection of said pocket-forming flap to the main wrapper portion and the remote edge of said flap, folding the remaining marginal wrapper portions over said pocket-forming flaps to close the end of the package, and applying heat and pressure to the overlapped flaps to seal same, said package being adapted to be opened by pulling the exposed grasping portion of said tear card outwardly and downwardly against said overlying pocket-forming flap to rupture same.

References Cited in the file of this patent

UNITED STATES PATENTS

| | | |
|---|---|---|
| 1,836,228 | Dryer | Dec. 15, 1931 |
| 2,197,219 | Groshong | Apr. 16, 1940 |
| 2,285,189 | Cornock | June 2, 1942 |
| 2,327,024 | Davidson et al. | Aug. 17, 1943 |
| 2,332,316 | Hexter et al. | Oct. 19, 1943 |
| 2,340,836 | Milmoe | Feb. 1, 1944 |
| 2,349,309 | Schmidt et al. | May 23, 1944 |
| 2,494,965 | Rosen | Jan. 17, 1950 |
| 2,692,723 | Elsman | Oct. 26, 1954 |
| 2,845,213 | Tamarin | July 29, 1958 |
| 2,923,110 | Tamarin | Feb. 2, 1960 |

FOREIGN PATENTS

| | | |
|---|---|---|
| 929,115 | Germany | June 20, 1955 |

OTHER REFERENCES

Publication entitled: The One Pull Opener for Bread Wrappers by Wilfrid Ledaux, pp. 1 to 5.